United States Patent
Urayama et al.

(10) Patent No.: US 8,919,748 B2
(45) Date of Patent: Dec. 30, 2014

(54) ACTIVE ANTIVIBRATION DEVICE AND MANUFACTURING METHOD FOR THE SAME

(75) Inventors: Atsushi Urayama, Tochigi (JP); Hirozumi Kon, Utsunomiya (JP); Hironori Koyama, Kasugai (JP); Mutsumi Muraoka, Aichi-ken (JP); Atsushi Muramatsu, Komaki (JP)

(73) Assignees: Keihin Corporation, Tokyo (JP); Sumitomo Riko Company Limited, Komaki (JP)

( * ) Notice: Subject to any disclaimer, the term of this patent is extended or adjusted under 35 U.S.C. 154(b) by 578 days.

(21) Appl. No.: 13/016,348

(22) Filed: Jan. 28, 2011

(65) Prior Publication Data

US 2011/0180980 A1 Jul. 28, 2011

(30) Foreign Application Priority Data

Jan. 28, 2010 (JP) .................................. 2010-016236
Jan. 28, 2010 (JP) .................................. 2010-016237

(51) Int. Cl.
| | | |
|---|---|---|
| F16F 5/00 | (2006.01) | |
| F16F 7/10 | (2006.01) | |
| H02K 41/035 | (2006.01) | |
| H02K 33/16 | (2006.01) | |

(52) U.S. Cl.
CPC .............. *H02K 33/16* (2013.01); *F16F 7/1011* (2013.01); *H02K 41/0356* (2013.01)
USPC .................................................. 267/140.14

(58) Field of Classification Search
USPC ........... 267/140.13–140.15, 136, 140.11, 195
See application file for complete search history.

(56) References Cited

U.S. PATENT DOCUMENTS

| | | | | |
|---|---|---|---|---|
| 6,305,675 B1 * | 10/2001 | Muramatsu | ............... | 267/140.14 |
| 6,315,277 B1 * | 11/2001 | Nagasawa | ................ | 267/140.14 |
| 6,565,072 B2 * | 5/2003 | Goto et al. | ............... | 267/140.14 |
| 6,588,737 B2 * | 7/2003 | Goto et al. | ............... | 267/140.14 |
| 2002/0036372 A1 * | 3/2002 | Goto et al. | ............... | 267/140.14 |
| 2004/0017033 A1 * | 1/2004 | Ichikawa et al. | ......... | 267/140.14 |
| 2008/0007125 A1 * | 1/2008 | Koyama et al. | .................. | 310/27 |
| 2011/0057367 A1 * | 3/2011 | Hasegawa et al. | ....... | 267/140.14 |

FOREIGN PATENT DOCUMENTS

| | | |
|---|---|---|
| JP | 06-042583 | 2/1994 |
| JP | 10-311367 | 11/1998 |
| JP | 2006-066840 | 3/2006 |
| JP | 2008-061423 | 3/2008 |
| JP | 2008-208895 A | 9/2008 |
| JP | 2009-273224 | 11/2009 |
| JP | 2010-014174 | 1/2010 |

OTHER PUBLICATIONS

Japanese Office Action issued in corresponding Japanese Application No. 2010-016236, dispatched on Jun. 25, 2013.
Japanese Office Action issued in corresponding Japanese Application No. 2010-016237, dispatched on Jul. 2, 2013.

* cited by examiner

*Primary Examiner* — Vishal Sahni
(74) *Attorney, Agent, or Firm* — Arent Fox LLP

(57) ABSTRACT

An active antivibration device which includes a main body, a mobile element which is elastically supported inside the main body and movable in an axial direction of the main body, and a coil which is disposed inside the main body and fixed to the main body. The mobile element includes a mobile axis body supported in the axial direction of the main body, and a first yoke, a permanent magnet and a second yoke which are held by the mobile axis body and disposed successively along an axial direction of the mobile axis body. The permanent magnet is magnetized in the axial direction of the mobile axis body and disposed between the first yoke and the second yoke.

6 Claims, 10 Drawing Sheets

FIG.10A  Present embodiment
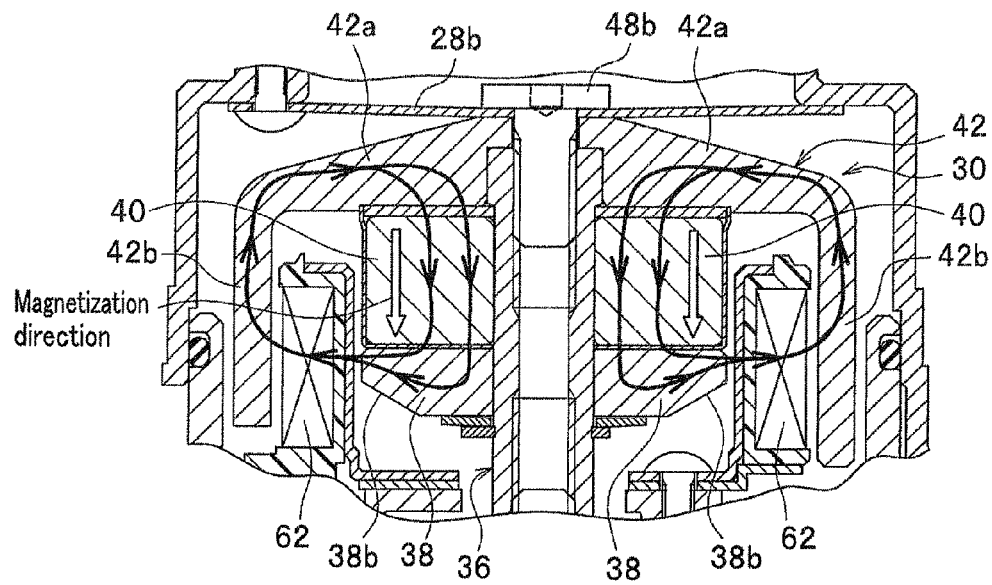
FIG.10B  Comparative example
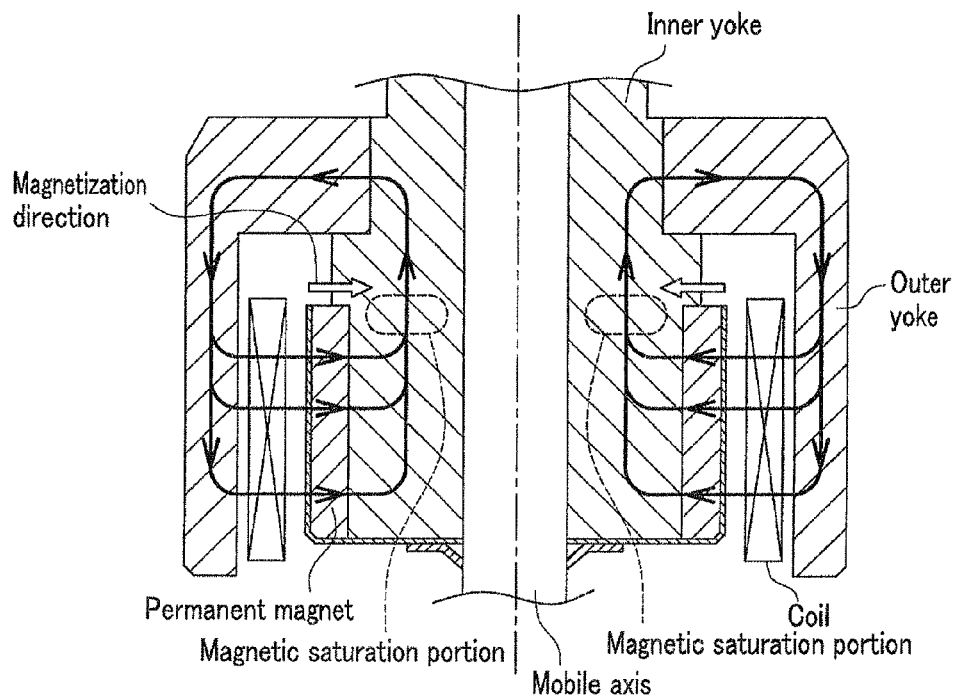

ACTIVE ANTIVIBRATION DEVICE AND MANUFACTURING METHOD FOR THE SAME

CROSS REFERENCE TO RELATED APPLICATIONS

This application claims the foreign priority benefit under Title 35, United States Code, §119(a)-(d) of Japanese Patent Applications No. 2010-016236 and No. 2010-016237, both filed on Jan. 28, 2010, the contents of which are hereby incorporated by reference.

BACKGROUND OF THE INVENTION

1. Field of the Invention

The present invention relates to an active antivibration device on an antivibration target member and capable of demonstrating an active antivibration effect by vibrating a mobile element by applying a current to a coil, and to a manufacturing method of the active antivibration device.

2. Description of Related Art

For example, in order to reduce vibrations of an antivibration target member which is required to reduce vibrations such as a body of a vehicle, generally, a vibration attenuating mechanism utilizing an attenuation effect of, for example, a shock absorber and a rubber elastic body, or a vibration isolating mechanism utilizing a spring effect of, for example, a coil spring and the rubber elastic body has been adopted. These vibration attenuating mechanism and vibration isolating mechanism demonstrate only a passive antivibration effect. Therefore, recently, a mechanism demonstrating a more active and higher antivibration effect has been desired.

With respect to this kind of active antivibration device, for example, Japanese Patent Publication No. 2008-208895 discloses an active antivibration device where a concentric positioning between an output member and a fixed side supporting member is accurately performed, thereby a clearance between a coil and a permanent magnet is accurately set, and as a result, the output member can be effectively vibrated.

Meanwhile, in the active antivibration device disclosed in Japanese Patent Publication No. 2008-208895, the output member on a mobile side includes a core metal having a rod shape and movably supported for applied vibrations along an axial direction at the center of the device body, an inner yoke engaged with the core metal from the outside, an outer yoke having substantially a cylindrical shape and connected to an outer side of the inner yoke with a predetermined clearance, and a cylindrical permanent magnet which is disposed between the inner yoke and the outer yoke along a circumferential direction of the inner yoke and the outer yoke and mounted on an annular step of the inner yoke. Those of the core metal, the inner yoke, the outer yoke, and the permanent magnet are disposed to be movable in a unified manner along the up and down direction. On the other hand, with respect to the fixed side, a structure that a coil arranged between the permanent magnet and the outer yoke is supported by the device body is adopted.

In this case, the cylindrical permanent magnet engaged with the inner yoke from the outside is magnetized in the radial direction of the cylindrical permanent magnet, where magnetic poles at the inner surface and at the outer surface of the permanent magnet are different with each other. Then, there is a possibility that a magnetic saturation is caused in the inner yoke arranged on the inner side of the permanent magnet by a combination of a magnetic flux generated by the permanent magnet and a magnetic flux generated by the coil by applying a current. As a result, a magnetic loss in the magnetic flux path increases, and an improvement of a magnetic propulsion force, that is, the improvement of a vibration applying force to be given to the mobile element becomes difficult.

In addition, in the active antivibration device disclosed in Japanese Patent Publication No. 2008-208895, an inner portion of a disc spring member is assembled first against a mobile axis portion which constitutes the output member in the assembly process. Therefore, an outer periphery portion of the disc spring member is required to be fixed by, for example, a securing ring fixed to an inner wall of the housing after the mobile axis portion is housed inside the housing.

Hence, in the active antivibration device disclosed in Japanese Patent Publication No. 2008-208895, it is required that a fixing portion of the disc spring member to be fixed to the housing is set at a position outer than the outer periphery of the output member. As a result, an outer diameter of the housing becomes large, thereby resulting in difficulty to decrease the outer diameter of the housing.

SUMMARY OF THE INVENTION

A general object of the present invention is to provide an active antivibration device which is capable of improving a magnetic propulsion force (vibration applying force) in comparison with a conventional one by suppressing a magnetic loss in a magnetic flux path by preventing a generation of a magnetic saturation.

A main object of the present invention is to provide an active antivibration device which is capable of reducing an outer diameter of a main body of the active antivibration device.

Another object of the present invention is to provide a manufacturing method of an active antivibration device which is capable of improving assembling to be easy and simple.

According to the present invention, a vibration applying force (a propulsion force) is generated by applying a current to a coil portion fixed to the main body, and a mobile element including a mobile axis body, a first yoke, a second yoke and a permanent magnet is moved along an axial direction of the mobile axis body by the vibration applying force. As a result, the vibration applying force based on the movement of the mobile element is transmitted to an antivibration target member through the main body, and vibrations that are problem of, for example, a vehicle body can be actively and compensatively reduced.

In the present invention, the permanent magnet is disposed between the first yoke and the second yoke, and in addition, the first yoke, the permanent magnet and the second yoke are arranged successively in this order along the axial direction of the mobile axis body. Therefore, in the present invention, it becomes possible to adopt a structure where no yoke is arranged on the inner circumferential side of the permanent magnet, thereby a magnetic flux path area through which a magnetic flux is continued from the permanent magnet to first yoke can be set large, and as a result, a generation of the magnetic saturation between the permanent magnet and the first yoke can be preferably prevented. Accordingly, in the present invention, it is possible to improve the magnetic propulsion force by suppressing a magnetic loss in the magnetic flux path by preventing a generation of the magnetic saturation.

In addition, in the present invention, a generation of a magnetic flux leakage can be prevented by forming a taper face of an annular inclined surface at an outer-bottom portion of the first yoke. Therefore, in the present invention, since the magnetic flux is positively continued from an outer-upper portion of the first yoke to the coil side, a generation of a magnetic flux (leaking magnetic flux) which does not contribute to the magnetic propulsion force can be suppressed at minimum. Accordingly, in the present invention, the magnetic propulsion force can be further improved by suppressing the magnetic loss in the magnetic flux path by preventing the generations of the magnetic saturation and the leaking magnetic flux.

In addition, in the present invention, since an elastic member for pushing the first yoke and the permanent magnet toward the other side (side opposite to the elastic member) of the mobile axis body is disposed, the permanent magnet and the first yoke can be closed (contacted) along the axial direction of the mobile axis body, and the permanent magnet and the first yoke can be arranged on a locking portion side that is the other side of the mobile axis body.

In addition, in the present invention, a locking portion which is located at a head portion of the mobile axis body and enlarged in diameter is disposed, and the locking portion of the mobile axis body is press fitted into a center hole portion of the second yoke, thereby the second yoke and the permanent magnet can be closed (contacted) along the axial direction of the mobile axis body. As a result, in the present invention, the first yoke, the permanent magnet and the second yoke are arranged and can be held (fixed) sequentially along the axial direction of the mobile axis body and close to each other, thereby a subassembly mobile element can be built.

Furthermore, in the present invention, since the second yoke and the permanent magnet are arranged close to each other, the permanent magnet and the first yoke are pushed toward the second yoke to be further close to each other in the axial direction of the mobile axis body, thereby resulting in improvement of the magnetic efficiency.

In the assembly process of the present invention, before the housing and a base body are assembled, a second flat spring member can be fixed to a ceiling surface of the housing in advance. Therefore, the second flat spring member can be easily fixed to the housing without interference from an outer diameter of the mobile element. As a result, in the present invention, since a space for fixing the second flat spring member to an outer circumferential side (outer diameter side) of the mobile element by a fixing member (for example, a conventional securing ring) is unnecessary and an outer diameter of the second flat spring member, which has a disc shape, can be reduced in comparison with the conventional one, a reduction of outer diameter of the housing can be achieved.

In addition, in the present invention, a support portion protruding inward by a predetermined distance is disposed at substantially a center portion of the base body in the axial direction, and the first flat spring member is fixed to one side (for example, bottom side) of the support portion, while the coil portion is fixed to the other side (for example, upper side) of the support portion. Therefore, the coil portion and the first flat spring member can be arranged separately on respective sides (upper side and bottom side) of the support portion.

As a result, in the present invention, a fixing portion of the coil portion inside the base body can be disposed in a dead space around the first yoke, thereby improving a layout of arrangement of the coil portion and finally contributing to downsizing of a main body consisting of the housing and the base body in the radial direction as well as in the axial direction.

In addition, in the present invention, an opening portion which is sealable by a sealing member is formed on a ceiling portion of the housing, and a fixing member which fixes the mobile axis body to the second flat spring member through the opening portion is disposed, thereby the mobile axis body can be easily fixed to the second flat spring member. Accordingly, in the present invention, the assembly work can be reduced, thereby resulting in cost reduction.

Furthermore, the present invention is a manufacturing method of an active antivibration device, in which a main body consists of a housing and a base body, a mobile element and a coil portion are arranged inside the main body, one end side of a mobile axis body constituting the mobile element is elastically supported by a first flat spring member whose outer circumferential portion is fixed to the base body, and the other end side of the mobile axis body is elastically supported by a second flat spring member whose outer circumferential portion is fixed to the housing. The second flat spring member is fixed to a ceiling surface of the housing in advance before the housing and the base body are assembled. When the housing and the base body are assembled, a fixing member is carried into the housing through an opening formed in the housing from outside in order to fix the mobile axis body to the second flat spring member by the fixing member.

In the present invention, using the foregoing assembly process, the second flat spring member can be fixed to the ceiling surface of the housing in advance before the housing and the base body are assembled. Therefore, the second flat spring member can be easily fixed to the housing without interference of the outer diameter of the mobile element, thereby resulting in reduction of the outer diameter of the housing.

BRIEF DESCRIPTION OF THE DRAWINGS

FIG. 10A is a schematic illustration showing a flow of a magnetic flux generated in the embodiment; and FIG. 10B is a schematic illustration showing a flow of a magnetic flux generated in an comparative example.

DETAILED DESCRIPTION OF THE PREFERRED EMBODIMENT

Figure 1:
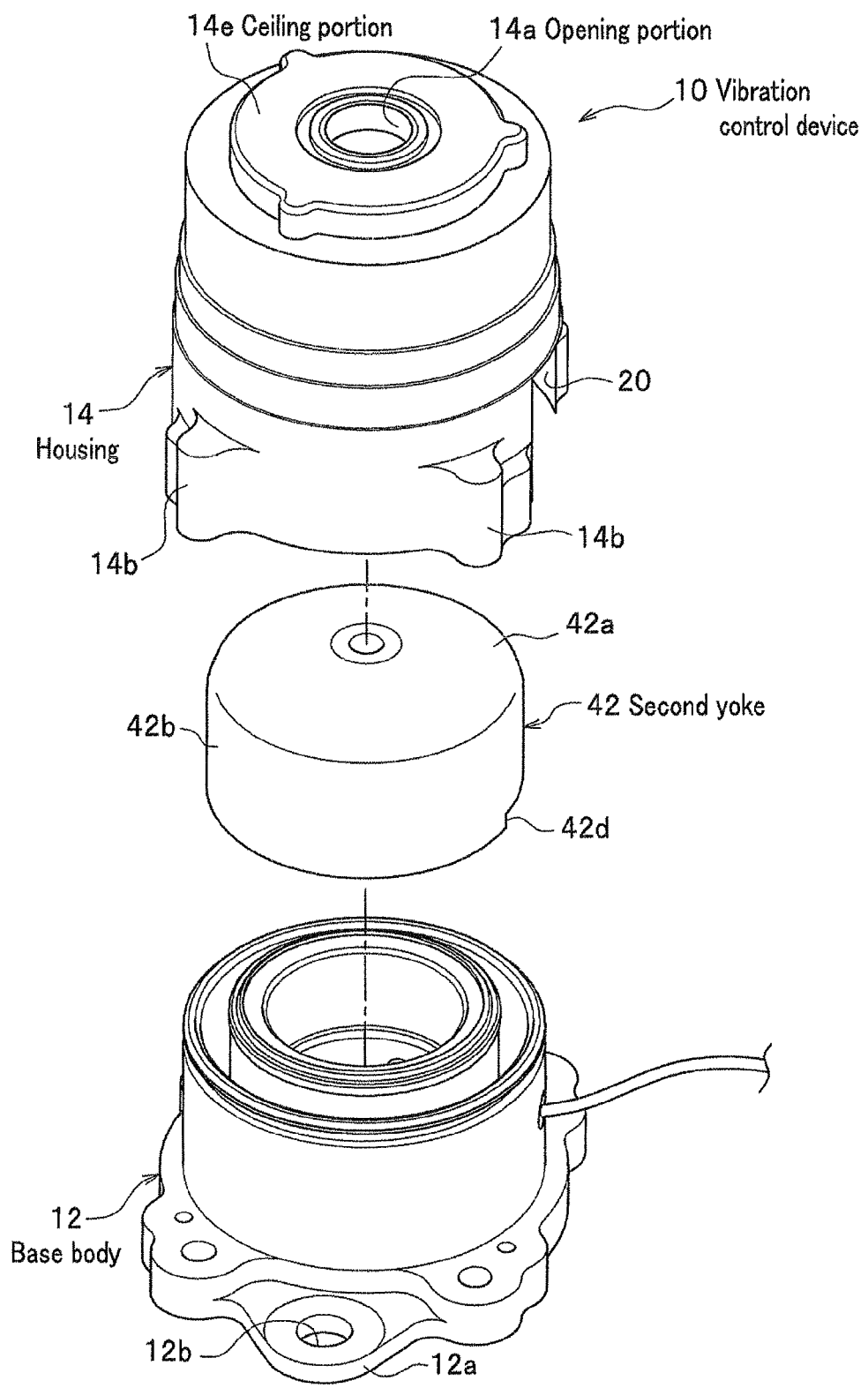
FIG. 1 is a schematic exploded perspective view of a vibration control device functioning as an active antivibration device according to an embodiment of the present invention.
Figure 2:
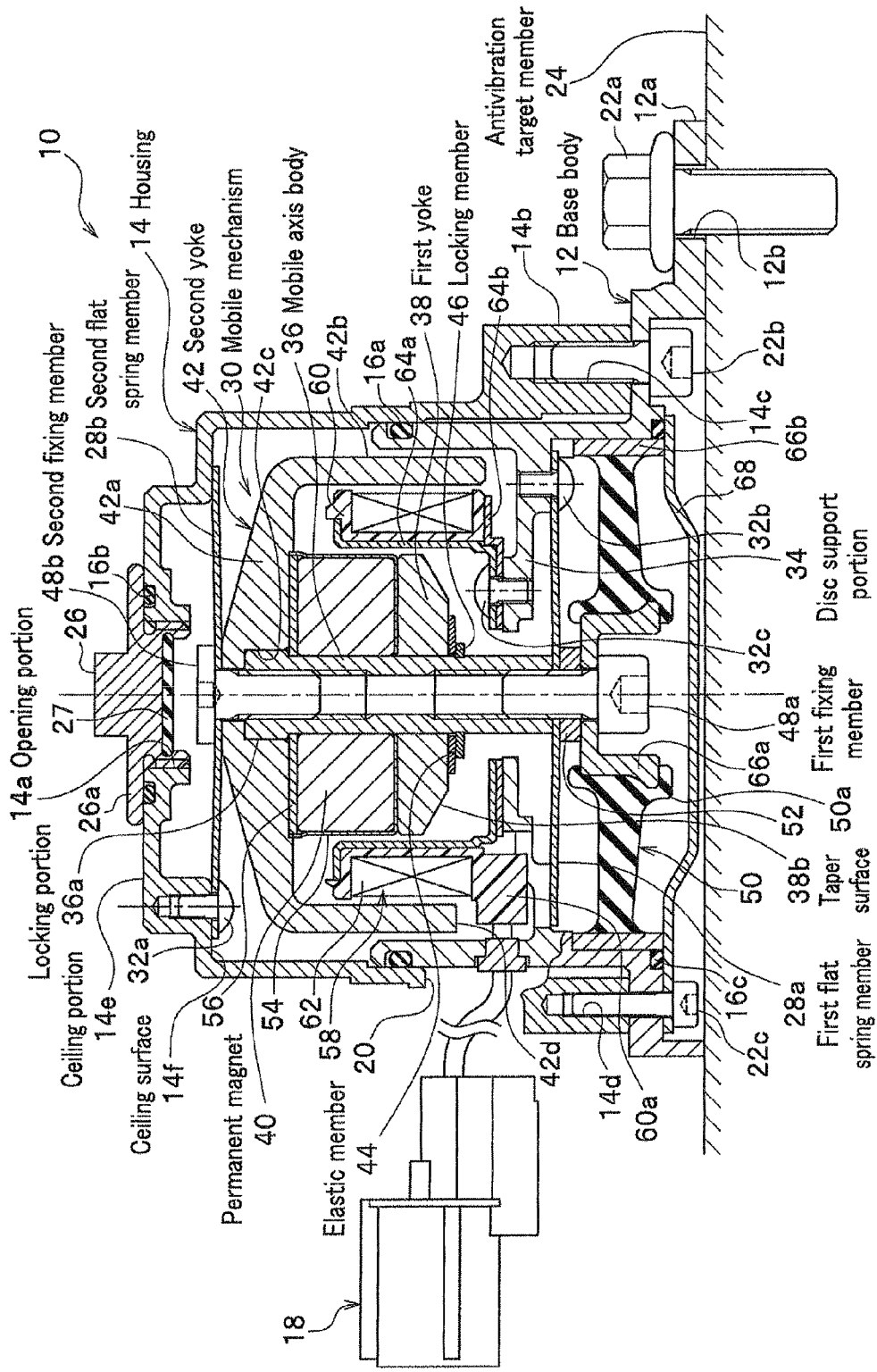
FIG. 2 is a vertical cross sectional view of the vibration control device shown in FIG. 1 along an axial direction of the vibration control device.

As shown in FIG. 1 and FIG. 2, a vibration control device 10 includes a base body 12 on the bottom side and a housing 14 on the upper side, and a main body is formed by a combination of the base body 12 and the housing 14 in a unified manner. Namely, one end portion on the upper side of the base body 12, which is opened at both end portions along the axial direction, is engaged with an opening side end portion of a bottom portion of the housing 14, which is formed in a bottomed cylindrical shape, to be jointed in a unified manner. It is noted that a sealing member 16a is disposed in a jointing portion between the base body 12 and the housing 14 using an annular groove, and inside of the housing 14 and the base body 12 is optimally sealed. In addition, in the housing 14, a cutout portion 20 which functions as a back clearance of a coupler 18, which will be described later, is formed.

The base body 12 on the bottom side consists of substantially a cylindrical body having substantially a circular opening at each of the upper end and the bottom end, and is fixed to an antivibration target member 24 such as an engine frame of a vehicle and a vehicle body frame by a large-diameter bolt member 22a inserted into a hole portion 12b of a fixing portion 12a which protrudes outward in the radial direction from the outer circumferential surface of the base body 12. The housing 14 on the upper side consists of a bottomed cylindrical body having a ceiling portion 14e on the upper side thereof, and an opening 14a having substantially a circular shape is formed in the center portion of the ceiling portion 14e of the housing 14.

As shown in FIG. 2, the opening portion 14a of the housing 14 is formed to be closable by a closing member 26 which is screwed into a thread portion, and a sealing member 16b is mounted in an annular groove formed in the vicinity of the opening portion 14a. Therefore, the upper face of the housing 14 is optimally sealed with a flange 26a of the closing member 26. A stopper rubber 27 which limits an uppermost position of a second fixing member 48b, described later, when a head portion of the second fixing member 48b comes in contact with the stopper rubber 27 is mounted on the center bottom portion of the closing member 26. Meanwhile, in FIG. 1, the closing member 26 and the sealing member 16b are omitted, and a status that the opening portion 14a of the housing 14 is exposed is shown.

On an outer-bottom circumferential surface of the housing 14, a protruding portion 14b which is formed protruding in the radial direction is disposed at a plurality of places (for example, four places), and a pair of bolt members 22b, 22c having different diameters with each other are screwed into a pair of screw holes 14c, 14d, respectively, which are formed in the protruding portion 14b and have different diameters with each other. The pair of the bolt members 22b, 22c having the different diameters with each other are fixed upward from the bottom of the pair of the screw holes 14c, 14d.

Inside a space sealed by the base body 12 on the bottom side and the housing 14 on the upper side, a mobile mechanism (mobile element) 30 is disposed to be capable of vibrating and moving in the up and down direction by spring forces of a first flat spring member 28a on the bottom side and a second flat spring member 28b on the upper side, each extending substantially in the horizontal direction.

Meanwhile, the second flat spring member 28b is fixed to a ceiling surface (inner wall) 14f of the housing 14 by a screw member 32a, and the first flat spring member 28a is fixed to a bottom surface of a disc-shaped support portion (support portion, hereinafter, referred to as disc support portion) 34 (described later) protruded inward from the base body 12 by a screw member 32b. In addition, a fixing position (an axis line position of the screw member 32a) of the second flat spring member 28b fixed to the ceiling surface 14f of the housing 14 by the screw member 32a is set at an inner side of the largest diameter of various elements constituting the mobile mechanism 30, described later, in order to reduce an outer diameter of the housing 14.

Figure 3:
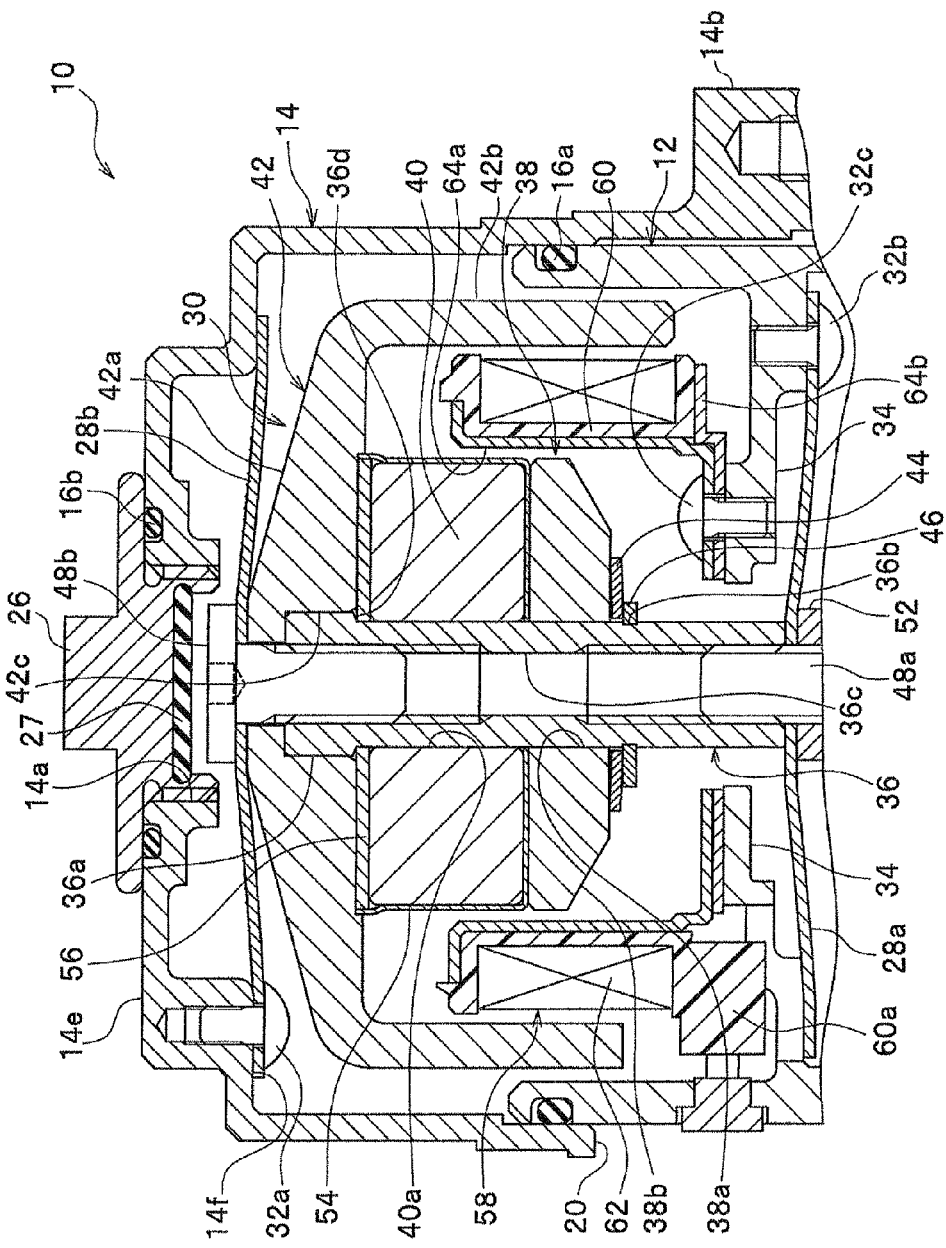
FIG. 3 is a partially enlarged vertical cross sectional view of FIG. 2.
Figure 4:
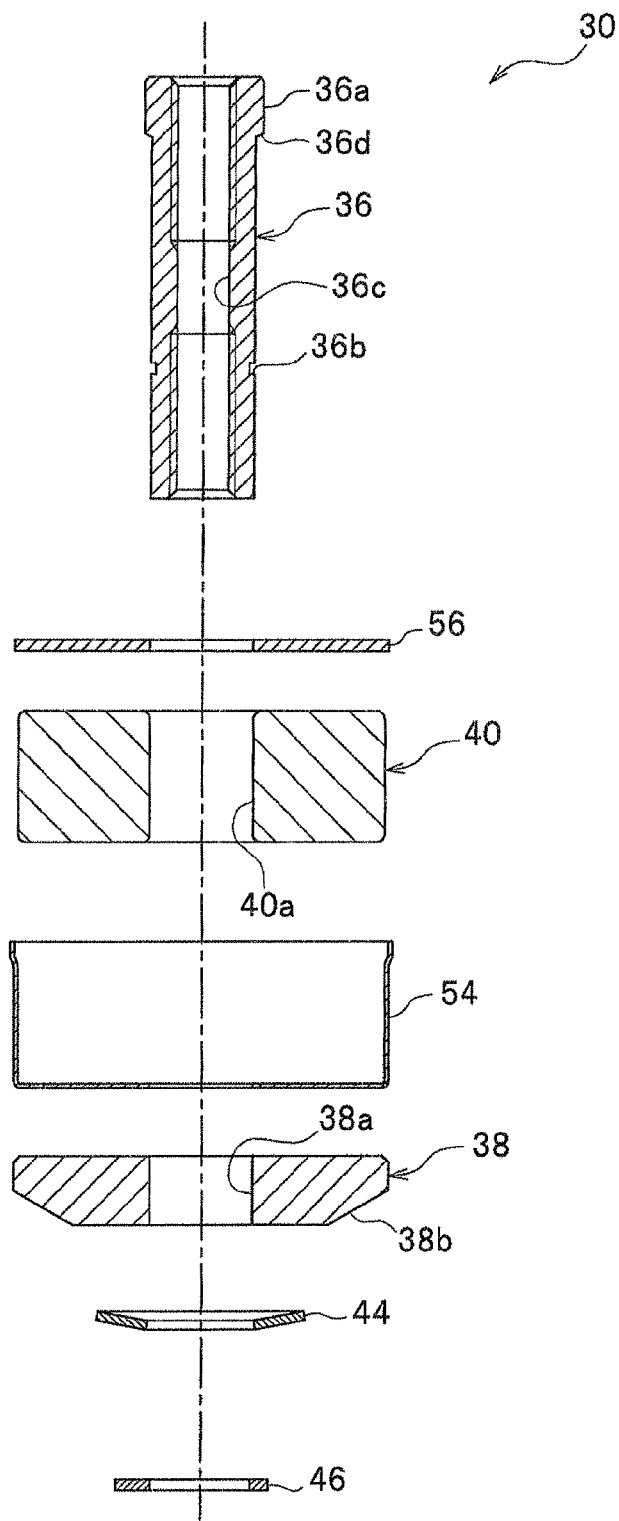
FIG. 4 is an exploded vertical cross sectional view of a main part of a mobile mechanism.

FIG. 3 is a partially enlarged vertical cross sectional view of FIG. 2. FIG. 4 is an exploded vertical cross sectional view of a main part of a mobile mechanism.

The mobile mechanism 30 includes a cylindrical mobile axis body 36 which extends in the up and down direction and is disposed between the first flat spring member 28a on the bottom side and the second flat spring member 28b on the upper side in the up and down direction, and a first yoke 38, a permanent magnet 40 and a second yoke 42 are sequentially arranged from the bottom side to the upper side in the axis direction of the mobile axis body 36.

In this case, the mobile axis body 36 includes a locking portion 36a that is a head portion (upper portion) of the mobile axis body 36 and a diameter of the locking portion 36a is formed to be larger in comparison with the other portions by a predetermined distance, and upper positions of the first yoke 38 and the permanent magnet 40 are limited by the locking portion 36a. In addition, for example, an elastic member 44 such as a disc spring is mounted on the outer circumferential surface of the mobile axis body 36 on the bottom side of the first yoke 38 in such a manner that the first yoke 38 and the permanent magnet 40 are pushed (impelled) toward the upper side (locking portion 36a) of the mobile axis body 36 by the elastic member 44. Furthermore, a locking member 46, for example, a C-clip is locked (mounted) in an annular groove 36b formed on the outer circumferential surface of the mobile axis body 36, and the first yoke 38 and the permanent magnet 40 are prevented from dropping downward by the locking member 46, thereby the first yoke 30 and the permanent magnet 40 are maintained in a unified manner against the mobile axis body 36.

A screw portion is formed on each of the bottom side and the upper side of a through-hole 36c in the axial direction of the mobile axis body 36 which is formed in a cylindrical shape. A first fixing member 48a having a bolt shape is screwed into a screw portion on the bottom side of the mobile axis body 36, and a support rubber elastic body 50 described later, a ring spacer 52 and the first flat spring member 28a are fixed (fastened) to the mobile axis body 36 in a unified manner by the first fixing member 48a. In addition, as will be described later, a second fixing member (fixing member) 48b having a bolt shape is screwed into a screw portion on the upper side of the mobile axis body 36 through the opening portion 14a of the housing 14, and the second flat spring member 28b and the second yoke 42 are fixed (fastened) to the mobile axis body 36 in a unified manner by the second fixing member 48b.

As shown in FIG. 4, the first yoke 38 is formed in substantially a disc shape and includes a through-hole 38a, where the mobile axis body 36 passes through, in the center portion of the first yoke 38, and a taper face 38b which is formed in an annular taper surface and prevents a generation of leaking magnetic flux is formed on the outer-bottom portion of the first yoke 38. This will be described later in detail.

Figure 5A:
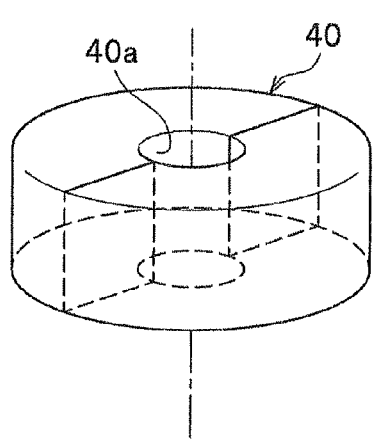
FIG. 5A is a perspective view showing a permanent magnet.
Figure 5B:
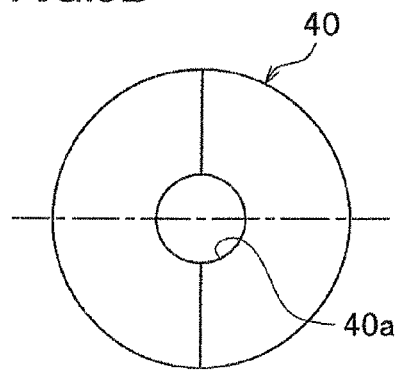
FIG. 5B is a top view of the permanent magnet.
Figure 5C:
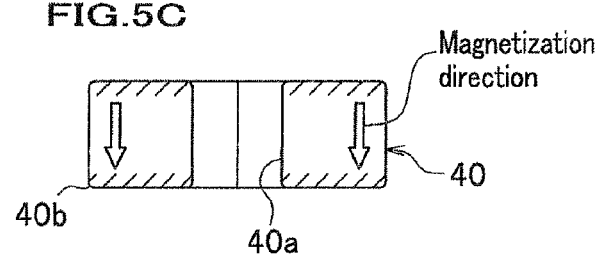
FIG. 5C is a cross sectional view showing a magnetization direction of the permanent magnet.

FIG. 5A is a perspective view of a permanent magnet, FIG. 5B is a top view of FIG. 5A, and FIG. 5C is a cross sectional view showing a magnetization direction.

The permanent magnet 40 is, as shown in FIG. 5A, formed in substantially an annular body as a whole, and includes a through-hole 40a, where the mobile axis body 36 passes through, in the center portion of the permanent magnet 40, and the upper surface and the bottom surface of the permanent magnet 40 in the axial direction have different magnetic poles with each other.

As shown in FIG. 5B, the permanent magnet 40 consists of halved structures each having substantially a semicircular shape, and the halved structures are arranged in an annular shape and housed inside a bottomed cylindrical holder 54 which is made of a nonmagnetic material, for example, SUS (JIS). A disc-shaped cover member 56 made of a magnetic material such as iron is engaged with an upper opening of the holder 54 in order to hold the permanent magnet 40. The permanent magnet 40 is magnetized (see arrows in FIG. 5C), for example, in such a manner that the upper surface and the bottom surface of the permanent magnet 40 in the axial direction have a south pole and a north pole, respectively. Then, a repulsive force works between the poles (south poles on respective upper surfaces, north poles on respective bottom surfaces) in the respective halved structures, thereby resulting in suitable arrangement of the halved structures in the inner-bottom circumferential surface portion of the holder 54.

It is noted that the permanent magnet 40 is not limited to the foregoing halved structure, and the permanent magnet 40 having, for example, a single annular body may be used without using the holder 54 and the cover member 56. In addition, the permanent magnet 40 having an annular body as a whole is not limited to a structure consisting of halved ones, and a plurality of arbitrarily divided permanent magnets may be arranged inside the holder 54 so as to form the annular shape. Furthermore, as a material of the permanent magnet 40, for example, any of alloy families, a ferrite-based material, a Sm—Co-based material, and a Nd—Fe—B-based material may be used.

The second yoke 42 is formed in substantially a bottomed cylindrical body, and includes an umbrella portion 42a extending outward in the radial direction from the center portion of the mobile axis body 36 and an annular portion 42b continuing from the umbrella portion 42a, bending along the axial direction of the mobile axis body 36, and extending substantially in parallel with an axis line of the mobile axis body 36. The umbrella portion 42a is formed so as to gradually decrease in thickness toward the outer periphery side from the center portion. In addition, the annular portion 42b is disposed apart from the first yoke 38 and the permanent magnet 40 by a predetermined distance in the radial direction, while housing the first yoke 38 and the permanent magnet 40 including a coil portion, which will be described later.

In other words, the locking portion 36a having an enlarged diameter is formed in the upper portion of the mobile axis body 36, and the locking member 46 is mounted on the bottom side of the mobile axis body 36. In addition, the permanent magnet 40 and the first yoke 38 are sequentially arranged between the locking portion 36a and locking member 46 in this order from the side of the locking portion 36a on the upper side along the axial direction of the mobile axis body 36. Furthermore, the elastic member 44 pushing the first yoke 38 upward (the side of the permanent magnet 40) is arranged between the first yoke 38 and the locking member 46.

Meanwhile, in the embodiment, the locking portion 36a is integrally formed with the mobile axis body 36 at the head portion of the mobile axis body 36. However, the locking portion 36a may be formed as a separate member from the mobile axis body 36 and may be fixed at the head portion of the mobile axis body 36. In addition, the elastic member 44 and the locking member 46 may be integrally formed using, for example, a clip with a disc spring.

In the center portion of the second yoke 42, a hole portion in which a second fixing member 48b, described later, is inserted and a center hole portion 42c which continues from the hole portion and in which the locking portion 36a of the mobile axis body 36 can be press fitted are formed, and the second yoke 42 and the permanent magnet 40 are close arranged in the axial direction of the mobile axis body 36 through the center hole portion 42c.

On an inner wall near the center portion of the base body 12 in the axial direction, a disc-shaped support portion (hereinafter, referred to as disc support portion) 34 protruding inward by a predetermined distance is disposed, and the first flat spring member 28a is fixed to the bottom side (one side) of the disc support portion 34 by a screw member 32b and the coil portion 58 is fixed to the upper side (the other side) of the disc support portion 34 by a screw member 32c.

Namely, on the inner wall of the base body 12, the annular disc support portion 34 protruding inward of the radial direction by a predetermined distance substantially in the horizontal direction is formed, and the first flat spring member 28a is fixed to the outer side, which is closer to the inner wall of the base body 12, of the disc support portion 34 by a screw member 32b screwed into a screw hole from the bottom side. On the other hand, the coil portion 58 is fixed to the inner side, which is closer to the mobile axis body 36, of the disc support portion 34 by another screw member 32c screwed into a screw hole from the upper side.

Meanwhile, in the embodiment, the disc support portion 34 supporting the coil portion 58 is integrally formed with the base body 12. However, the disc support portion 34 maybe formed as a separate member from the base body 12 and may be fixed to the base body 12 by, for example, a screw member.

The coil portion 58 includes, for example, a coil bobbin 60 made of a non-conductive material such as resin, a coil 62 which is wound on the coil bobbin 60, and a first holding plate 64a and a second holding plate 64b which sandwich the upper end surface and the bottom end surface of the coil bobbin 60, respectively, to hold the coil 62. The first holding plate 64a and the second holding plate 64b are preferably made of a non-magnetic material such as SUS (Stainless Used Steel). It is noted that a bobbin-less structure may be used for the coil 62 by omitting the coil bobbin 60.

In addition, the coil 62 is electrically connected to a terminal portion of a coupler 18 exposed outside through lead wires. In this case, in a skirt portion of the annular portion 42b constituting the second yoke 42, a cutout portion 42d (see FIG. 1) which functions as a back clearance for avoiding interference with a thick portion 60a of the bobbin 60 is disposed.

On the bottom side of the first flat spring member 28a, a support rubber elastic body 50 for supporting the mobile mechanism 30 is disposed. An inner surface of the support rubber elastic body 50 in the radial direction is bonded to a first metal 66a in a unified manner with vulcanization bonding, and an outer surface of the support rubber elastic body 50 in the radial direction is bonded to a second metal 66b in a unified manner with vulcanization bonding. The first metal 66a is formed of a bottomed cylindrical body, and the second metal 66b is formed of an annular band.

In this case, the first metal 66a on the inner side of the support rubber elastic body 50 is screw-clamped by the first fixing member 48a, which is fastened to the bottom portion of the mobile axis body 36, via a ring spacer 52. On the other hand, the second metal 66b on the outer side of the support rubber elastic body 50 is fixed to the inner wall of the base body 12 by a cap member 68. Meanwhile, a stopper portion 50a which limits a lower position by contacting with the cap member 68 is disposed on the inner-bottom side of the support rubber elastic body 50 that is close to the first metal 66a.

In addition, the cap member 68 is fixed to a bottom portion of the base body 12 by a bolt member 22c screwed into from the bottom side. Meanwhile, a sealing member 16c is mounted on an annular step in a jointing portion between the cap member 68 and the base body 12, and, for example, rain water is preferably prevented from entering into the base body 12 and the housing 14 by the sealing member 16c.

The vibration control device 10 according to the embodiment is basically configured as described above, and the effects and operations thereof will be explained next.

First, an assembly process of the mobile mechanism 30 will be explained.

As shown in FIG. 4, the cover member 56, the permanent magnet 40, the holder 54, the first yoke 38, and the elastic member 44 are sequentially passed through along the mobile axis body 36 from the bottom side end portion where there is no locking portion 36a of the mobile axis body 36. Then, the locking member 46 formed of, for example, a C-clip is mounted (locked) in the annular groove 36b which is formed on the outer circumferential surface of the mobile axis body 36, and the assembly body is completed.

In this case, for example, upper positions of the cover member 56 and the permanent magnet 40 which are passed through along the axial direction of the mobile axis body 36 are limited by contacting with the locking portion 36a of the mobile axis body 36, while the first yoke 38 is pushed toward a direction to be close contacted with the permanent magnet 40 by a pushing force (spring force) of the elastic member 44. Meanwhile, in the condition where each of the elements is sequentially disposed along the axial direction of the mobile axis body 36, the permanent magnet 40 is magnetized in the axial direction of the permanent magnet 40, that is, each end side of the permanent magnet 40 in the axial direction has a different magnetic pole.

Figure 6A:
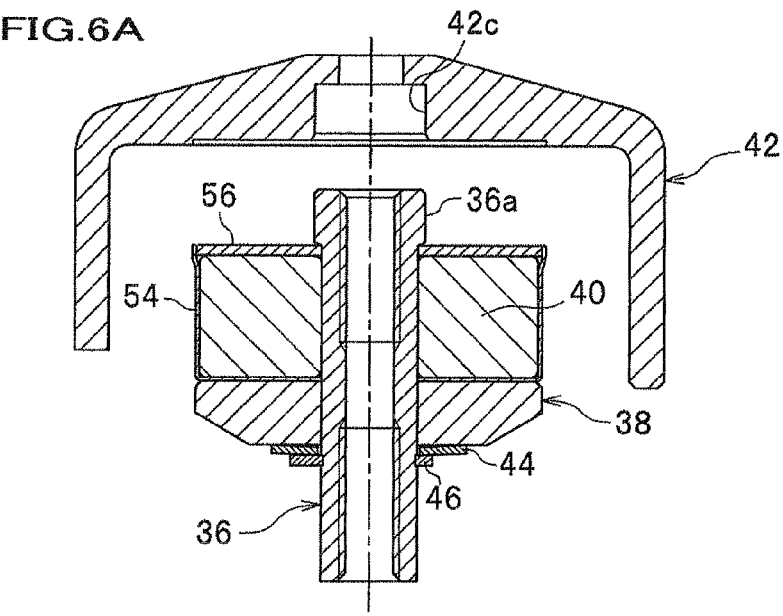
FIG. 6A and FIG. 6B are vertical cross sectional views for explaining a press fitting of a second yoke into an assembly body.
Figure 6B:
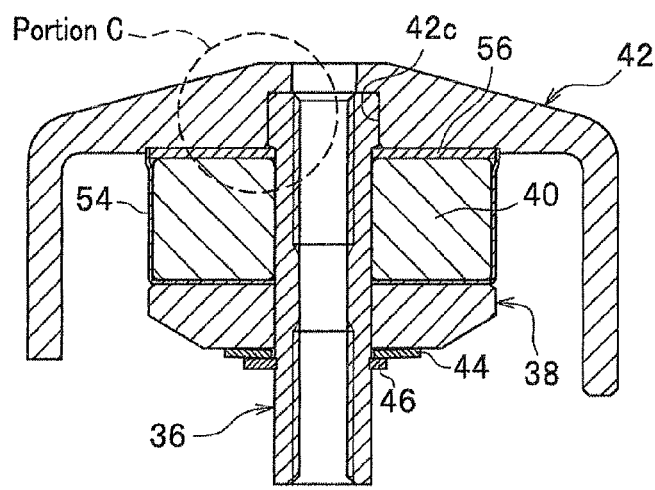
Figure 6C:
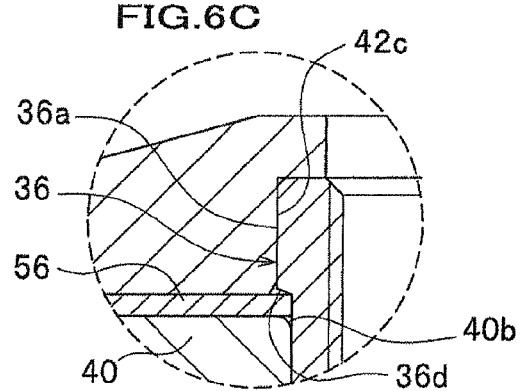
FIG. 6C is an enlarged cross sectional view of a portion C of FIG. 6B.

FIG. 6A and FIG. 6B are vertical cross sectional views showing a condition of press fitting of the second yoke in the assembly body assembled as described above. FIG. 6C is an enlarged cross sectional view of a portion C of FIG. 6B.

As shown in FIG. 6A and FIG. 6B, a center hole portion 42c of the second yoke 42 is press fitted with the locking portion 36a of the mobile axis body 36, which constitutes the assembly body, along the axial direction of the mobile axis body 36. In this case, the press fitting in the axial direction is limited by contact of end face of the mobile axis body 36 with an annular step portion formed in the center hole portion 42c. When the second yoke 42 is press fitted with the mobile axis body 36, the permanent magnet 40 is magnetized in advance. However, since the upper position of the cover member 56 is limited by the locking portion 36a of the mobile axis body 36, the permanent magnet 40 is prevented from sticking on the side of the second yoke 42. Accordingly, the assembly operation becomes favorable.

Meanwhile, the cover member 56 is a member for holding the permanent magnet 40. However, since the cover member 56 is made of a magnetic material, a blocking of a magnetic flux flow at the interface between the second yoke 42 and the permanent magnet 40 is minimized. In addition, since an outer circumferential portion of the cover member 56 is fitted in an inner circumference of upper opening portion of the holder 54, when the second yoke 42 is press fitted with the mobile axis body 36 and a facing portion of the second yoke 42 facing the cover member 56 comes in contact with the cover member 56, if the second yoke 42 reaches the foregoing press fit limiting position of the second yoke 42, the second yoke 42, the cover member 56, the permanent magnet 40, the holder 54, and the first yoke 38 are close arranged with each other by the pushing force (spring force) of the elastic member 44. As a result, each of the elements constituting the mobile mechanism 30 is close arranged along the axial direction of the mobile axis body 36, and the magnetic efficiency can be improved, accordingly.

As shown in FIG. 6C, an outer edge portion 40b of the permanent magnet 40 is beveled in a round shape. However, since the cover member 56 to be fitted in the opening portion of the holder 54 is disposed, the cover member 56 can be locked at the small annular step portion 36d formed in the mobile axis body 36. As a result, as will be described later, a reduction of effective area where the magnetic flux flows in the second yoke 42 can be suppressed to the minimum. It is noted that the permanent magnet 40 may be magnetized after the second yoke 42 is press fitted with the mobile axis body 36.

FIG. 7A to FIG. 9B are vertical cross sectional views showing an assembly process of the vibration control device 10.

Figure 7A:
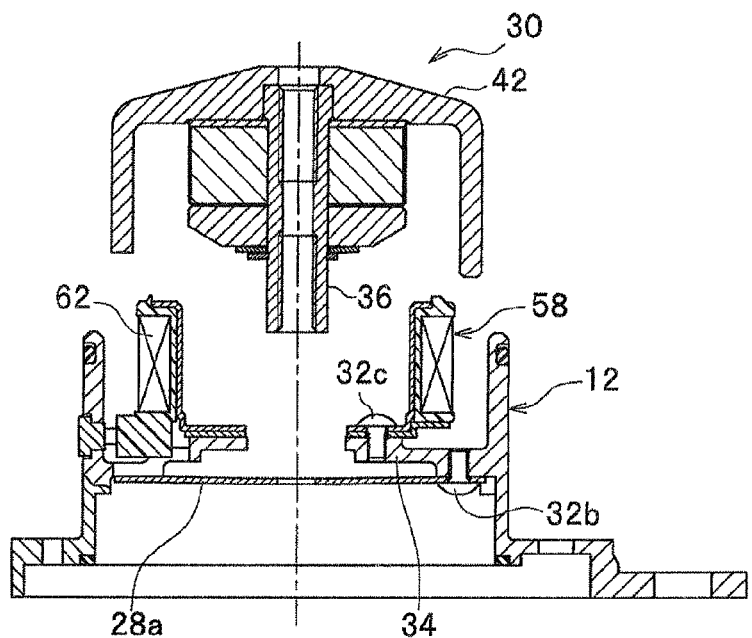
FIG. 7A and FIG. 7B are vertical cross sectional views lo showing an assembly process of the vibration control device.

First, as shown in FIG. 7A, the first flat spring member 28a is fixed to the disc support portion 34 of the base body 12 by the screw member 32b screwed from the bottom side, and the coil portion 58 is fixed to the disc support portion 34 by another screw member 32c screwed from the upper side. Next, an assembly body of the mobile mechanism 30 including the second yoke 42 is inserted in the base body 12 from the upper side, and a bottom end portion of the mobile axis body 36 constituting the mobile mechanism 30 is contacted with the upper surface of the first flat spring member 28a to be supported.

Figure 7B:
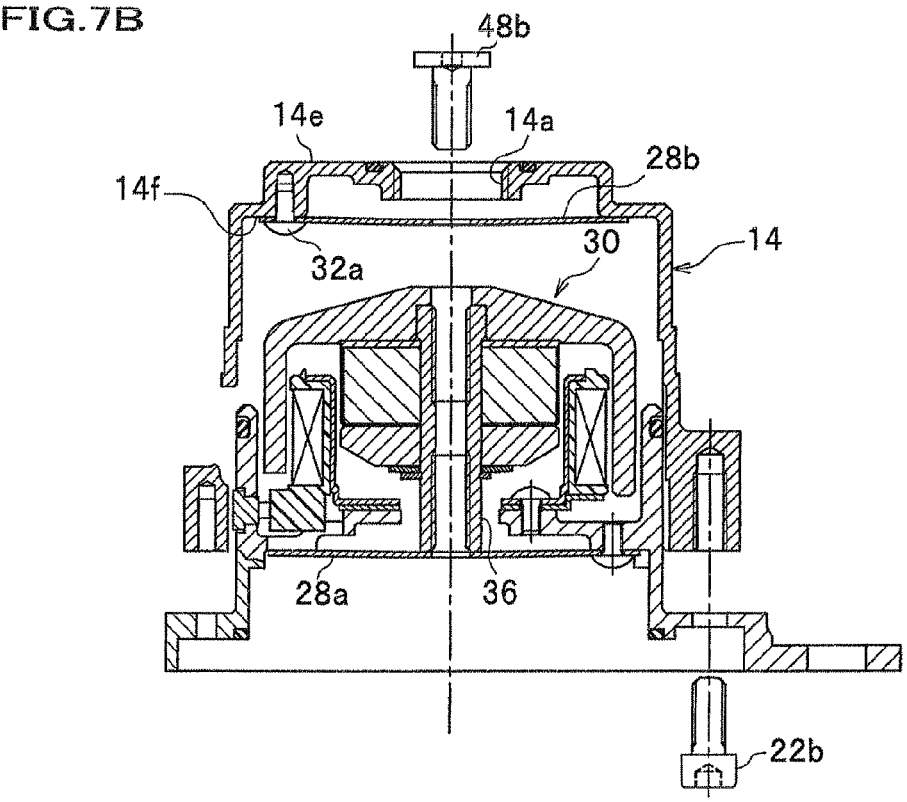

Next, as shown in FIG. 7B, the housing 14 provided with the second flat spring member 28b which is fixed to the ceiling surface 14f in advance by the screw member 32a is engaged with the base body 12, and the housing 14 and the base body 12 are fastened in a unified manner by the bolt member 22b.

Namely, before the housing 14 and the base body 12 are assembled, the second flat spring member 28b is fixed to the ceiling surface 14f of the housing 14 in advance by the screw member 32a. When the housing 14 and the base body 12 are assembled, the second fixing member 48b is carried inside the housing 14 from outside through the opening portion 14a formed in the housing 14. After the mobile axis body 36 and the second flat spring member 28b are fixed by the second fixing member 48b, the housing 14 and the base body 12 are fastened in a unified manner by the bolt member 22b.

Figure 8A:
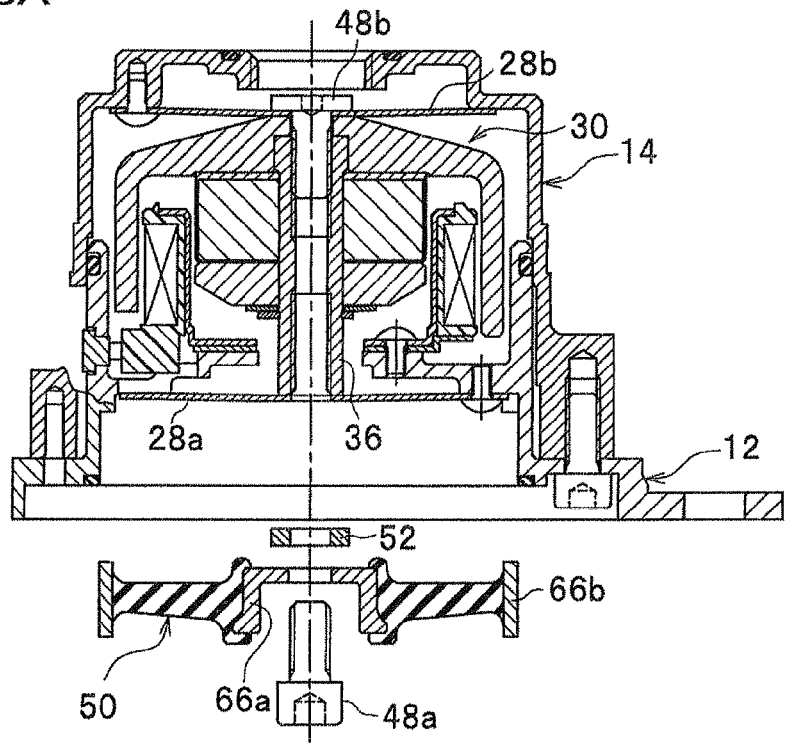
FIG. 8A and FIG. 8B are vertical cross sectional views showing an assembly process of the vibration control device.

In addition, as shown in FIG. 7B, after the second fixing member 48b is carried inside the housing 14 through the opening portion 14a which is formed on the ceiling portion 14e of the housing 14 and not sealed yet by a sealing member 26, the upper end side of the mobile mechanism 30 is elastically supported by the second flat spring member 28b (by the spring force of the second flat spring member 28b) by screwing the second fixing member 48b into a screw portion on the upper side of the mobile axis body 36 as shown in FIG. 8A. In addition, as shown in FIG. 8A, the support rubber elastic body 50 and the first flat spring member 28a are concurrently fastened to the bottom side of the mobile axis body 36 by screwing the first fixing member 48a into a screw portion on the bottom side of the mobile axis body 36 from the bottom side.

Figure 8B:
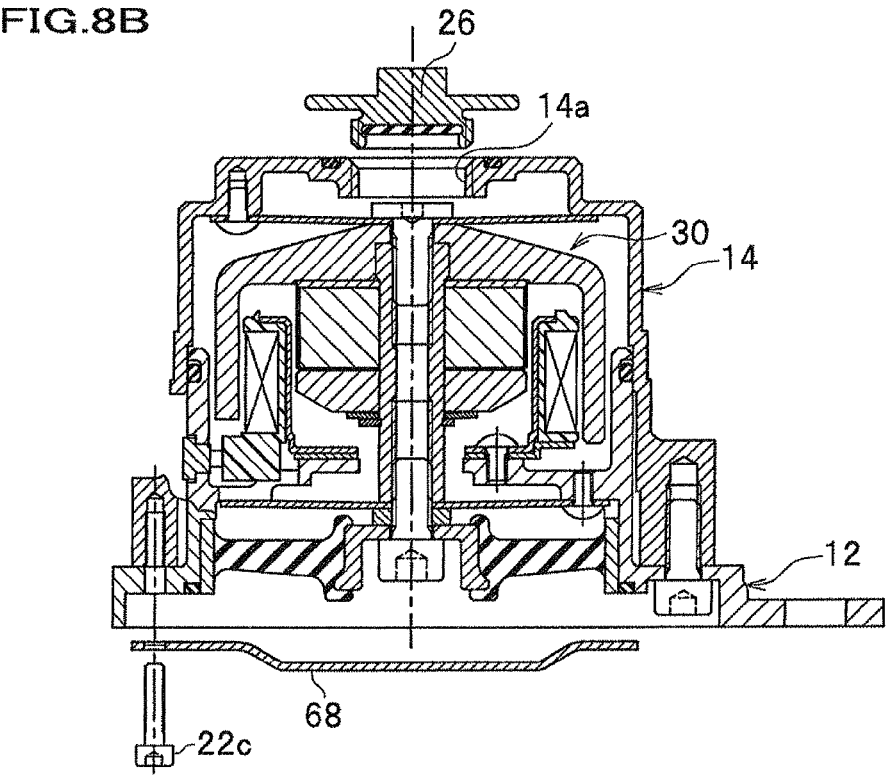

Subsequently, as shown in FIG. 8B, the cap member 68 is fixed to the bottom portion of the base body 12 by the screw member 22c and the opening portion 14a of the housing 14 is sealed by the sealing member 26, then, the assembly operation of the vibration control device 10 is completed.

Figure 9A:
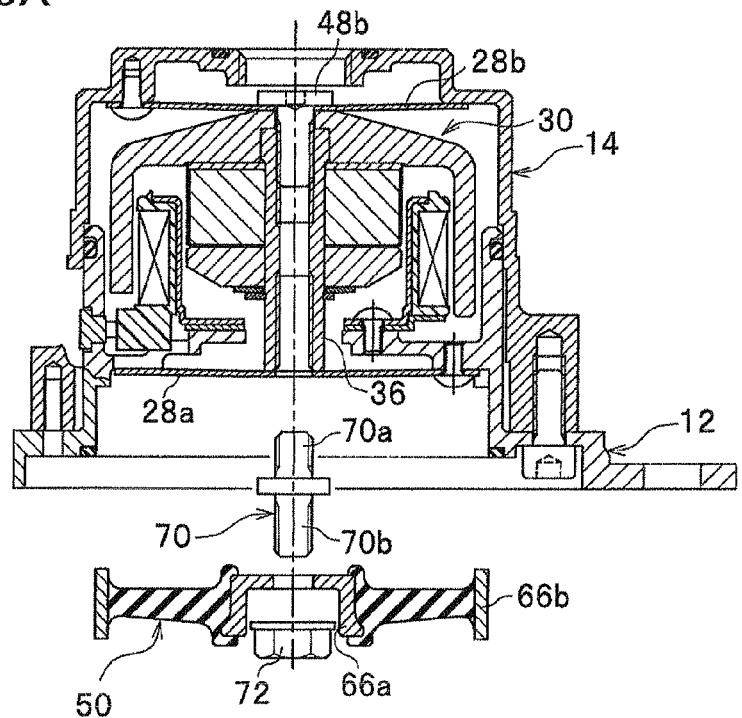
FIG. 9A and FIG. 9B are vertical cross sectional views showing an another assembly process of the vibration control device.
Figure 9B:
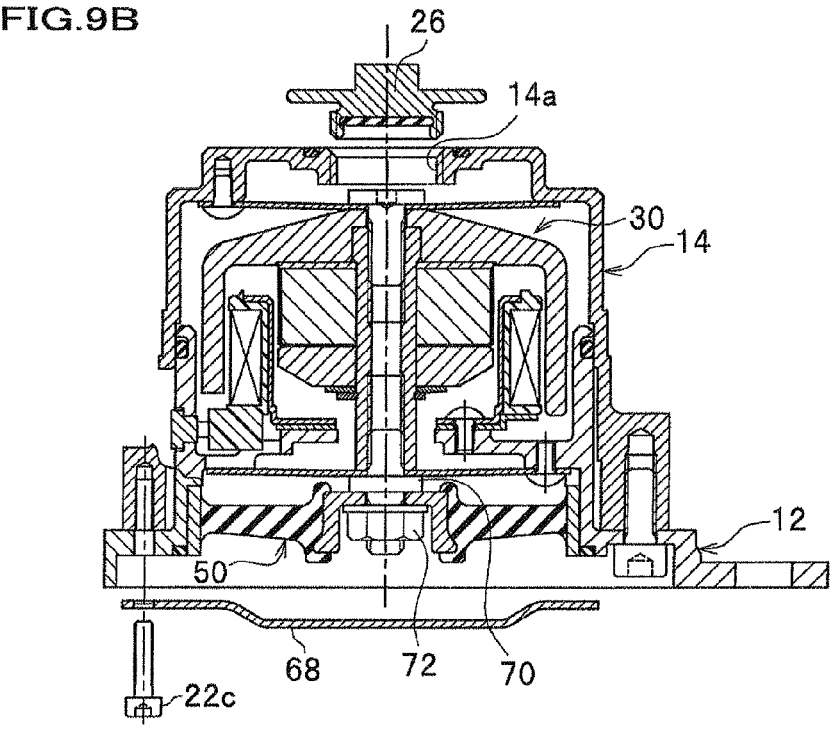

Meanwhile, as shown in FIG. 9A and FIG. 9B, the first flat spring member 28a and the support rubber elastic body 50 may be fixed as follows. A cross volt 70 having screw portions 70a, 70b on respective end portions in the axial direction and a nut 72 are used. The one screw portion 70a of the screw bolt 70 is screwed into a screw hole on the bottom side of the mobile axis body 36 to fix the first flat spring member 28a first, and subsequently, the nut 72 is fastened to the other screw portion 70b of the cross bolt 70 to fix the support rubber elastic body 50. In this case, the other screw portion 70b of the cross bolt 70 functions as a fixing portion of an elastic body which fixes the support rubber elastic body 50.

In the embodiment, when applying current to the coil 62 from a power feeding apparatus, not shown, via the coupler 18, a current flows in the coil 62 which is arranged in a magnetic flux path, that is, in a magnetic field formed by the permanent magnet 40, the first yoke 38 and the second yoke 42 as shown in FIG. 10A. Therefore, a Lorentz force (Fleming's left-hand rule) works on the fixed coil 62, and as a reaction force of the Lorentz force, a force (vibration applying force) to vibrate the mobile mechanism 30 is generated.

In the embodiment, the vibration applying force (propulsion force) is generated by applying current to the coil 62, and the mobile mechanism 30 including, for example, the mobile axis body 36, the first yoke 38, the second yoke 42 and the permanent magnet 40 is moved by the vibration applying force along the axial direction of the mobile axis body 36. As a result, a vibration applying force due to the movement of the mobile mechanism 30 is transmitted to the antivibration target member 24, and vibrations that are problems of, for example, a vehicle body are actively reduced or in a compensative manner.

In contrast, as shown in FIG. 10B, in a comparative example which includes an inner yoke engaged with a mobile axis, an outer yoke and a cylindrical permanent magnet mounted on an annular step of the inner yoke, as well as provided with a coil fixed to the main body side of the device, the cylindrical permanent magnet engaged with the inner yoke is magnetized (see arrows of magnetization direction) in the radial direction of the permanent magnet, that is, the inner surface and the outer surface of the permanent magnet have different magnetic poles with each other. Therefore, there is a possibility to cause a magnetic saturation (see magnetic saturation portion in FIG. 10B) in the inner yoke arranged on the inner side of the permanent magnet in the radial direction by the magnetic fluxes generated by the permanent magnet and the coil which is applied current. As a result, a magnetic loss in the magnetic flux path may become large, and thereby, improvement of the magnetic propulsion force, that is, the improvement of the vibration applying force to be given to a mobile element may become difficult.

In other words, in the comparative example shown in FIG. 10B, since the inner yoke is arranged on the inner side of the permanent magnet in the radial direction, a magnetic flux to be generated flows in order of permanent magnet →inner yoke →outer yoke →coil, and large area setting for the magnetic flux path between the permanent magnet and the inner yoke may become difficult, thereby the magnetic saturation may be caused.

Meanwhile, as a current (or voltage) applied to the coil 62, an alternative current that is controlled according to a frequency of a vibration that causes a problem, or a direct current whose ON/OFF is controlled at a predetermined cycle may preferably be used. As described above, the vibration control device 10 according to the embodiment operates as a dynamic vibration absorbing device by the function of the mobile mechanism 30 as a massive mobile member against the antivibration target member 24 such as a vehicle body.

In addition, in the embodiment, the case that the vibration control device 10 is applied to an active vibration control device 10 was exemplified. The active vibration control device 10 is directly attached to the antivibration target member 24 such as a vehicle body and directly reduces vibrations given to the antivibration target member 24. However, the application of the vibration control device 10 is not limited to this, and for example, as shown in FIG. 1 of Japanese Patent Publication No. 2004-293602, maybe applied to an active antivibration mount (active control mount: ACM) which is arranged between members of vibration transmission system.

In the embodiment, the permanent magnet 40 is arranged between the first yoke 38 and the second yoke 42, and in addition, the first yoke 38, the permanent magnet 40 and the second yoke 42 are sequentially arranged in this order in the axial direction of the mobile axis body 36 (see FIG. 2 and FIG. 3) toward the second flat spring member 28b on the upper side from the first flat spring member 28a on the bottom side. As understood by comparing a magnetic flux flow of the embodiment shown in FIG. 10A with a magnetic flux flow of the comparative example shown in FIG. 10B, it becomes possible in the embodiment to adopt a structure that no yoke (inner yoke) is arranged inside the permanent magnet in the radial direction. As a result, a magnetic flux path area of the magnetic flux continuing from the permanent magnet 40 to the first yoke 38 can be set large, and thereby, a generation of the magnetic saturation in the first yoke 38 can be preferably prevented.

Accordingly, in the embodiment, a magnetic loss in the magnetic flux path can be suppressed by preventing a generation of the magnetic saturation, thereby resulting in improvement of the magnetic propulsion.

In addition, in the embodiment, a generation of a leaking magnetic flux can be prevented by forming a taper face 38b formed of an annular inclined surface in the outer-bottom portion of the first yoke 38. Therefore, in the embodiment, as shown in FIG. 10A, the magnetic flux is positively continued from the outer-upper portion of the first yoke 38 to the side of the coil 62, and a generation of a magnetic flux which does not contribute to the magnetic propulsion force (leaking magnetic flux) can be suppressed to the minimum. As a result, in the embodiment, the magnetic propulsion force can be further improved by suppressing the magnetic loss in the magnetic flux path by preventing generations of the magnetic saturation and the leaking magnetic flux.

Furthermore, in the embodiment, the permanent magnet 40 and the first yoke 38 can be close contacted (tightly contacted) with each other in the axial direction of the mobile axis body 36 by disposing the elastic member 44 which pushes the first yoke 38 and the permanent magnet 40 toward the locking portion 36a (the other side) of the mobile axis body 36, thereby the permanent magnet 40 and the first yoke 38 can be arranged on the side of the locking portion 36a that is the other side of the mobile axis body 36.

In this case, for example, even if there are temperature differences among the elements, since the elastic member 44 works to relax a difference of linear expansion coefficient of each of the mobile elements such as the permanent magnet 40, the first yoke 38 and the mobile axis body 36, the each of the mobile elements can be close contacted with the other side of the mobile axis body 36 in spite of the temperature differences of the elements. As a result, in the embodiment, since the elements are pushed to the other side of the mobile axis body 36 by the elastic member 44, while improving the magnetic efficiency, backlash of the permanent magnet 40 and the first yoke 38 can be prevented.

Furthermore, in the embodiment, the locking portion 36a having an enlarged diameter is disposed at the head portion of the mobile axis body 36, and the locking portion 36a of the mobile axis body 36 is press fitted into the center hole portion 42c of the second yoke 42. Therefore, the second yoke 42 and the permanent magnet 40 can be arranged in close contact (close contact) with each other in the axial direction of the mobile axis body 36. As a result, in the embodiment, the first yoke 38, the permanent magnet 40 and the second yoke 42 which are disposed in this order from the bottom of the mobile axis body 36 can be held (fixed) in close contact with each other in the axial direction of the mobile axis body 36, thereby a subassembly mobile element (mobile mechanism 30) can be built.

In addition, in the embodiment, since the permanent magnet 40 and the first yoke 38 are pushed toward the second yoke 42 by arranging the second yoke 42 in close contact with the permanent magnet 40, the elements are further close contacted with each other in the axial direction of the mobile axis body 36, thereby the magnetic efficiency can be further improved.

In the embodiment, as shown in FIG. 7B, in the assembly process of the vibration control device 10, the second flat spring member 28b is fixed to the ceiling surface 14f of the housing 14 in advance by the screw member 32a before the housing 14 and the base body 12 are assembled. Therefore, the second flat spring member 28b can be easily fixed without interference of the outer diameter (for example, an outer diameter of the annular portion 42b of the second yoke 42. The outer diameter has the maximum diameter in the mobile mechanism 30) of the mobile element (mobile mechanism 30).

As a result, in the embodiment, it is unnecessary to dispose a space of fixing by a fixing member (for example, a conventional securing ring) on an outer circumferential side (outer diameter side) of the mobile element, and an outer diameter of the second flat spring member 28b having a disc shape can be reduced in comparison with the conventional one. Then, the outer diameter of the housing 14 can be made small.

In addition, in the embodiment, the first flat spring member 28a on the bottom side is fixed to the disc support portion 34 of the base body 12 and the second flat spring member 28b is fixed to the ceiling surface 14f of the housing 14, that is, the first and the second flat spring members 28a, 28b are separately fixed to two members of the base body 12 and the housing 14, respectively. As a result, the assembly work, where the respective end portions of the mobile element in the axial direction are elastically supported, can be easily performed.

Therefore, in the embodiment, even when the coil portion 58 is arranged close to the mobile element within the base body 12 and the housing 14 and between the outer diameter surface of the first yoke 38 (permanent magnet 40) and the annular portion 42b of the second yoke 42, the respective end portions of the mobile element in the axial direction can be elastically supported by the first and the second flat spring members 28a, 28b without sliding.

In addition, in the embodiment, the disc support portion 34 protruding inward by a predetermined distance is disposed near a center portion in the axial direction of the base body 12, and the first flat spring member 28a is fixed to one face (bottom face) of the disc support portion 34 and the coil portion 58 is fixed to the other face (upper face) of the disc support portion 34. Hence, the coil portion 58 and the first flat spring member 28a can be separately arranged on respective sides (upper face and bottom face) of the disc support portion 34.

As a result, in the embodiment, a fixing portion of the coil portion 58 inside the base body 12 can be disposed in a dead space on the bottom side of the first yoke 38, thereby resulting in improvement of a layout of arrangement of the coil portion 58 and finally contributing to downsizing of the housing 14 and the base body 12 in the radial direction as well as the axial direction.

Furthermore, in the embodiment, the opening portion 14a which is sealable by the sealing member 26 is formed on the ceiling portion 14e of the housing 14, and as shown in FIG. 7B, the second fixing member 48b which passes through the opening portion 14a and fixes the mobile axis body 36 to the second flat spring member 28b is disposed. Then, the mobile axis body 36 can be easily fixed to the second flat spring member 28b. As a result, in the embodiment, the assembly work can be reduced to reduce the cost.

What is claimed is:

1. An active antivibration device, comprising:
   a main body formed by a base body and a housing which are combined in a unified manner;
   a mobile element which is elastically supported inside the main body and movable in an axial direction of the main body; and
   a coil which is disposed inside the main body and fixed to the main body,
   wherein the mobile element includes a mobile axis body whose respective ends in the axial direction of the main body are elastically supported by a first flat spring and a second flat spring, and a first yoke, a permanent magnet and a second yoke which are held by the mobile axis body and disposed successively along an axial direction of the mobile axis body,
   wherein the first flat spring whose outer circumferential portion is fixed to an inside of the base body is disposed on one side of the main body in the axial direction of the main body, and the second flat spring whose outer circumferential portion is fixed to a ceiling surface of the housing is disposed on the other side of the main body in the axial direction of the main body, where the outer circumferential portion of the second flat spring is not fixed to an outer circumferential side of the mobile element,
   wherein the permanent magnet is magnetized in the axial direction of the mobile axis body and disposed between the first yoke and the second yoke, and
   wherein an elastic member and a locking member are disposed on one side of the mobile axis body in the axial direction between the first flat spring and the second flat spring, the elastic member pushing the first yoke and the permanent magnet toward the other side of the mobile axis body in the axial direction of the mobile axis body, the locking member being engaged with an outer circumferential surface of the mobile axis body;
   wherein a locking portion of the mobile axis body has a larger diameter in comparison with a portion of the mobile axis body holding the first yoke and permanent magnet disposed on the other side of the mobile axis body in the axial direction of the mobile axis body; and
   wherein in the mobile element, the first yoke, the permanent magnet and second yoke are closely arranged in this order along the axial direction of the mobile axis body from the one side that is a side of the elastic member to the other side that is a side of the locking portion.

2. The active antivibration device according to claim 1, wherein the first yoke is formed in substantially a disc shape, and a taper face provided on said first yoke for suppressing a generation of a leaking magnetic flux is disposed on an outer-bottom portion of the first yoke.

3. The active antivibration device according to claim 1, wherein the second yoke is provided with a center hole to which the locking portion of the mobile axis body is fixed.

4. The active antivibration device according to claim 1, wherein the base body is disposed on a bottom side of the main body and whose respective ends in an axial direction of the main body being opened and having substantially a cylindrical shape, the housing being disposed on an upper side of the main body and having a bottomed cylindrical shape.

5. The active antivibration device according to claim 4,
wherein a support portion protruding radially inward by a
predetermined distance is disposed near a center portion
of the base body in the axial direction of the main body,
and the first flat spring is fixed to one side of the support
portion and the coil is fixed to the other side of the
support portion.

6. The active antivibration device according to claim 4,
wherein an opening which is sealable by a sealing member
is formed in a ceiling portion of the housing, and a fixing
member for fixing the mobile axis body to the second flat
spring by being passed through the opening is disposed.

* * * * *